(12) United States Patent  
Ohsumi

(10) Patent No.: US 7,133,091 B2  
(45) Date of Patent: Nov. 7, 2006

(54) LIQUID CRYSTAL DISPLAY PANEL, LIQUID CRYSTAL DISPLAY DEVICE AND COMPOSITE OPTICAL ELEMENT

(75) Inventor: Kazumasa Ohsumi, Saitama (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 09/288,217

(22) Filed: Apr. 8, 1999

(65) Prior Publication Data

US 2003/0156233 A1 Aug. 21, 2003

(30) Foreign Application Priority Data

Apr. 8, 1998 (JP) ................................ 10-112723

(51) Int. Cl.
*G02F 1/1335* (2006.01)

(52) U.S. Cl. ........................................... 349/64; 349/65
(58) Field of Classification Search ............ 349/61–68; 362/26–31; 359/599
See application file for complete search history.

(56) References Cited

U.S. PATENT DOCUMENTS

| | | | | |
|---|---|---|---|---|
| 5,587,816 A | * | 12/1996 | Gunjima et al. | 349/62 |
| 5,808,713 A | * | 9/1998 | Broer et al. | 349/98 |
| 5,973,833 A | * | 10/1999 | Booth et al. | 359/487 |
| 6,104,454 A | * | 8/2000 | Hiyama et al. | 349/65 |
| 6,322,225 B1 | * | 11/2001 | Koike | 362/620 |
| 6,559,911 B1 | * | 5/2003 | Arakawa et al. | 349/96 |

FOREIGN PATENT DOCUMENTS

| | | |
|---|---|---|
| CN | 325524 | 1/1998 |
| JP | 06-034961 | 2/1994 |
| JP | 06-265892 | 9/1994 |
| JP | 10-254371 | * 9/1998 |

* cited by examiner

*Primary Examiner*—Dung T. Nguyen
(74) *Attorney, Agent, or Firm*—Staas & Halsey LLP

(57) ABSTRACT

LCD panel 12 is mounted on surface light source device 11 outputting an oblique preferential emission under emission promotion by scattering pattern formed on emission face 13C. Back face 13B provides a light control face correcting directivity toward a frontal direction in a plane parallel to incidence end face 13A. Directivity is further corrected toward a frontal direction in a plane perpendicular to face 13A by a prism sheet 21 which is coupled with panel 12 to provide a composite optical element unified with a polarization film 16. Output light from liquid crystal 18 impinges onto a polarization film 20. Light component corresponding to a transmission polarization plane of polarization film 20 is outputted out of the device after being transmitting film 20. Prism sheet 21 may be coupled with another member like polarization separating sheet member. Prism projection rows avoid from being damaged or deformed.

2 Claims, 5 Drawing Sheets

LIQUID CRYSTAL DISPLAY PANEL, LIQUID CRYSTAL DISPLAY DEVICE AND COMPOSITE OPTICAL ELEMENT

BACKGROUND

1. Field of Invention

The present invention relates to a liquid crystal display panel, a liquid crystal display device and a composite optical element, in particular, to an improved liquid crystal display panel and a liquid crystal display device equipped with the improved liquid crystal display panel as well as to a composite optical element relating to the improvement.

2. Related Art

According to an prior art, a liquid crystal display incorporated in a liquid crystal display (LCD) is illuminated by a surface light source device of side light type. In general, the surface light source device of side light type comprises a guide plate and a primary light source such as rod-like light source which is disposed along an incidence end face of the guide plate. Such arrangement has an advantage such that application to LCD brings only a little increase in thickness.

Primary light emitted from the primary light source is introduced into the guide plate through the incidence end face. According to well known processes including-reflection and scattering, the guide plate deflects the introduced light to produce emission from an emission face provided by a major face. Thus emitted light is supplied to a liquid crystal display panel thorough an additional element such as prism sheet.

Two types of guide plates are known. One type is featured by overall uniform thickness while type is featured by tendency to be decreasing in thickness according to distance from an incidence end face. In general, the latter is capable of emitting illumination light more effectively as compared with the former.

A surface light source device of side light type employing a guide plate of the latter type is shown in FIG. 4 providing an exploded perspective view and in FIG. 5 providing a cross section view along line depicted in FIG. 4. Referring to FIGS. 4 and 5, a surface light source device of side light type 1 comprises a guide plate 2, a primary light source 3, a reflection sheet 4 and a prism sheet 6 as a light control member. The reflection sheet 4, the guide plate 2 and the prism sheet 6 are laminatedly arranged in order. The primary light source 3 is disposed beside an incidence end face 2A of the guide plate 2.

The primary light source 3 consists of, for example, a cold cathode lamp (fluorescent lamp) 8 backed by a reflector 9. Illumination light (primary light) emitted from the fluorescent lamp 8 is supplied to the incidence end face 2A of the guide plate 2 through an opening of the reflector 9. The reflector is a sheet-like member with regular or irregular reflectivity.

The reflection sheet 4 is, for example, a sheet-like member with regular reflectivity to which silver is evaporation-deposited, reflecting light leaked out of the guide plate 2 to return the leaked light into the guide plate 2. This prevents loss of light energy.

The guide plate 2 is a transparent plate-like member made of acrylic resin (PMMA resin) having a wedge-shaped cross section. Such a guide plate 2 is produced, for example, by means of injection molding. Illumination light L introduce into the guide plate 2 through the incidence end face 2A propagates to approach an opposite end face while repeated reflection between a back face 2B and an emission face 2C is effected. Reflection by the back face 2B and that by the emission face 2C involve some emission out of the guide plate 2.

Light emitted from the back face 2B returns to the guide plate 2 directly or via the reflection sheet 4. Light emitted from the emission face 2C is lead to a LCD panel (not shown) via a prism sheet 6.

Light diffusion pattern is applied to the emission face 2C, as required, so that brightness distribution is adjusted by promoting emission from the emission face. This light diffusion pattern consists of, for instance, a great number of rough regions which are distributed according to a certain arrangement rule.

It is well known that the emission face 2C of such a guide plate 2 provides a preferential output which is inclined forward (that is, toward an distal end of wedge-shape). Such property is called "emission directivity ".

The prism sheet 6 as a light control member is disposed along the emission face 2C of the guide plate 2 to modify such emission directivity. The prism sheet 6 is an optical member an inner face of which provides a prismatic surface, being made of light permeable material such as polycarbonate or polyethylene terephthalate.

The prismatic surface is provided with a great number of projection rows with triangular cross section. Each projection row includes a pair of slopes and runs approximately parallel to the incidence end face 2A.

As well known, emitted light is subject to refraction and inner reflection exerted by slope pairs of the prism sheet 6 arranged as above, with the result that inclined preferential propagation direction (principal propagation direction) is corrected to a frontal direction with respect to the emission face 2C.

Such prior art involves a problem. That is, as the prism sheet 6 is disposed on the emission face 2C of the guide plate 2, static electricity tends to cause the prism sheet 6 to sticK to the emission face 2C.

As a result, prism sheet 6 scrapes against the emission face 2C, thereby causing projection ]rows to be damaged or deformed. In particular, if light scattering pattern is applied to the emission face 2C, this problem will be serious.

Damage or deform of projection rows affects particularly and strikingly top-shapes of projection rows so that tops are eroded off. Such breakage brings white turbidity which is observed from the side of the LCD panel. If the surface light source device 1 is applied to the LCD without elimination such turbidity, display quality of the LCD is reduced without fail.

According an prior art, the prism sheet 6 is made of a soft material in order to overcome this problem. However, such a prism sheet 6 made of a soft material tends to be affected by deformation of cross section after long time operations, thereby deteriorating emission characteristics of illumination light. Beside this, the prism sheet 6 sticks partially to the emission face 2C, with the result that undesirable pattern tends to appear on the emission face 2C.

OBJECT AND SUMMARY OF INVENTION

The present invention is proposed under the above-described background. An object of the present invention is to provide a novel liquid crystal display panel, a novel liquid crystal display as well as a novel composite optical element and thereby to realize to avoid damage and deformation which would affect a light control face for modifying directivity of emission of guide plate.

The present invention improves a liquid crystal display panel which is disposed apart from a surface light source device provided with a guide plate having an incidence end face, an emission face and a primary light source supplying primary light which enters into the guide plate through the incidence end face and is emitted from the guide plate through the emission face to provide illumination output light for backlighting of the liquid crystal display panel.

According to the improvement, a light control face for modifying directivity of the illumination output light is disposed so as to be facing to the surface light source device.

The present invention also improves a liquid crystal display comprising a liquid crystal display panel which is disposed apart from a surface light source device provided with a guide plate having an incidence end face, an emission face and a primary light source supplying primary light which enters into the guide plate through the incidence end face and is emitted from the guide plate through the emission face to provide illumination output light for backlighting of the liquid crystal display panel.

According to this improvement, the liquid crystal display panel is provided with a light control face for modifying directivity of the illumination output light, the light control face facing to the surface light source device. The emission face of the guide plate may be provided with light scattering pattern for promoting emission.

Such improvements in LCD panel and LCD prevent a light control face and emission face of surface light source device from being contacted. Accordingly, aforedescribed problem which would be brought by contact of a light control member with the emission face is solved.

The present invention also provides an improved composite optical element which is capable of being applied to such a LCD panel and LCD.

A composite optical element in accordance with the present invention comprises a polarization film one face of which provides a light control face for modifying directivity of input light.

This improvement enables a process for incorporating a polarization film in a LCD panel to involve incorporating of a light control element in the LCD panel.

Another composite optical element in accordance with the present invention comprises a polarization separating sheet member which transmits input light component having a polarization plane and reflects input light component having another polarization plane perpendicular to the polarization plane, wherein one face of the polarization separating sheet member provides a light control face for modifying directivity of input light.

This improvement enables a process for incorporating a polarization separating sheet in a LCD panel to involve incorporating of a light control element in the LCD panel together with the polarization separating sheet.

Still another composite optical element in accordance with the present invention comprises a laminated structure, the structure including a polarization separating sheet member which transmits input light component having a polarization plane and reflects input light component having another polarization plane perpendicular to the former polarization plane; and a polarization film, wherein one face of the composite optical element provides a light control face for modifying directivity of input light.

This improvement enables an arrangement including a LCD in which a light control member and a polarization film are incorporated to be realized through a process for incorporating one piece of laminated structure in the LCD panel.

The above-described and the other features of the present invention will be understood well and in detail from the following description with referring to the accompanied drawings.

EMBODIMENTS

Figure 1:
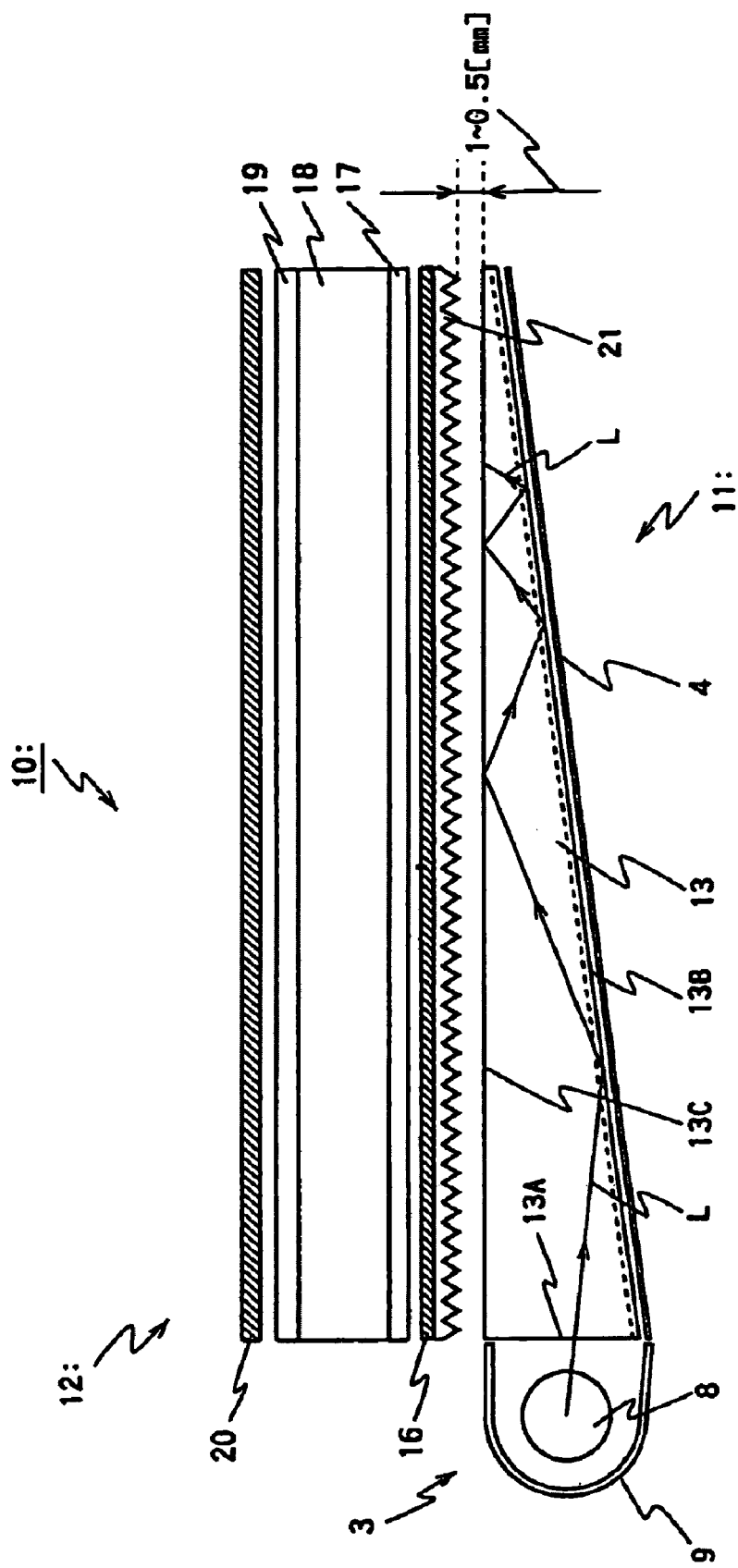
FIG. 1 is a cross section to illustrate a LCD of an embodiment in accordance with the present invention.
Figure 4:
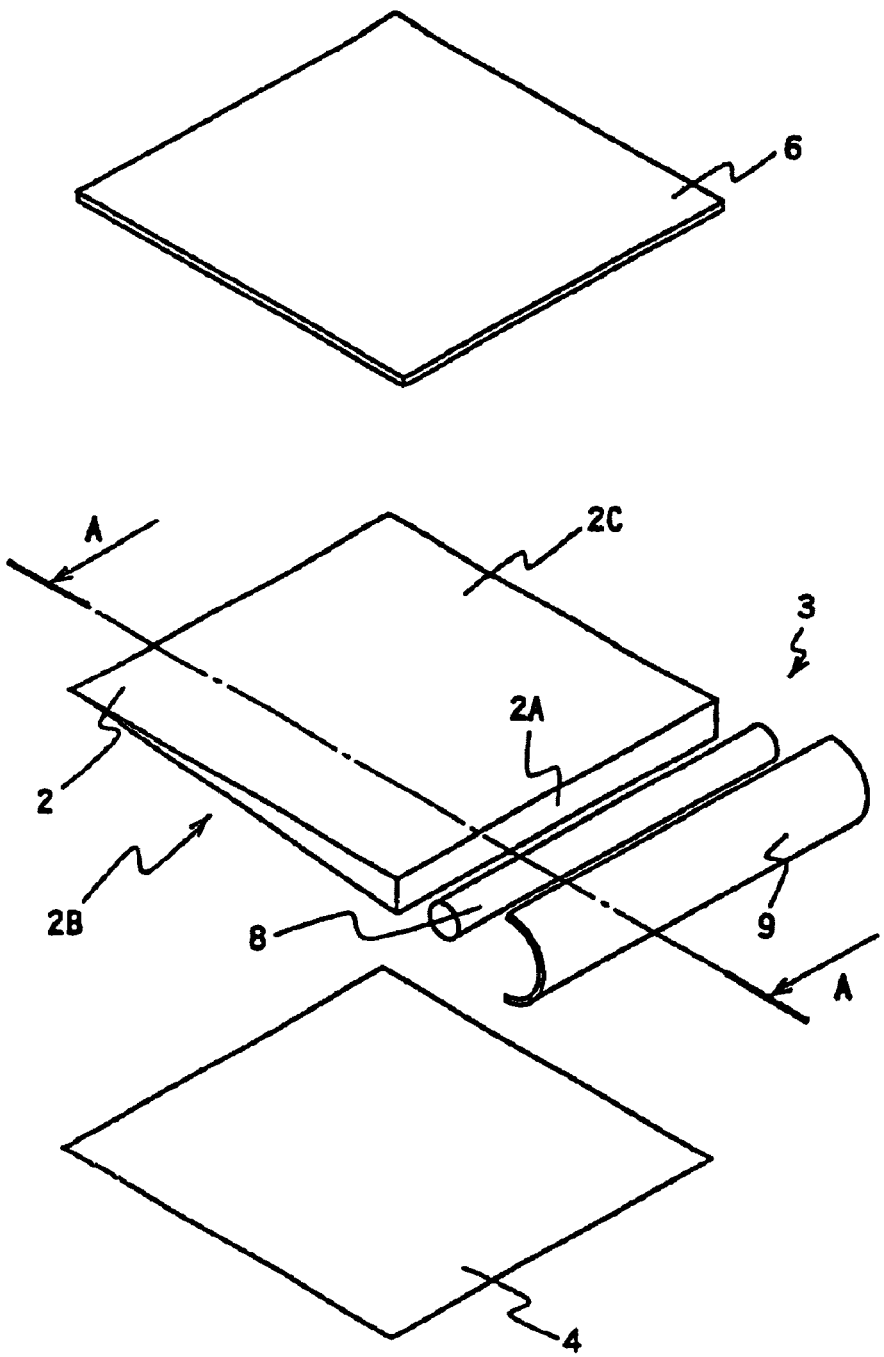
FIG. 4 is an exploded perspective view of a conventional surface light source device of side light type.

FIG. 1 is a cross section view of a LCD as an embodiment in accordance with the present invention, being illustrated in a manner similar to that of FIG. 4. In the following description, members employed in common to the surface light source device shown in FIG. 4 are commonly indexed and repeated explanation is omitted.

A LCD 10 includes a surface light source device of side light type 11 and a LCD panel 12 arranged on an upper face of the surface light source device.

The surface light source device 11 comprises a wedge-like guide plate 13, a primary light source and a reflection sheet 4 which are arranged in a frame that is not shown. The guide plate 13 is made of a transparent resin such as acrylic resin and is produced, for example, by mean of injection molding.

An emission face 13C of the guide plate 13 provides a light scattering face. On the light scattering face, a great number of fine rough regions are formed to provide a light scattering pattern. The rough regions are formed by partially roughening the emission face. These numerous fine rough regions are distributed according to an arrangement with regularity or irregularity.

A back face 13B of the guide plate 13 provides a prismatic surface provided with a great number of projection rows. The projection rows run approximately at right angle with respect to an incidence end face 13A. Each projection row includes a pair of slopes and corrects directivity regarding in a plane parallel to the incidence end face 13 A mainly through inner reflection. In general, this prismatic surface makes angular spread of the emission from the emission face 13C narrow and gathered around a frontal direction regarding in a plane parallel to the incidence end face. Thus the prismatic surface functions as a light control face.

Output light of the surface light source device 11 (i.e. output light from the emission face 13C) shines on the LCD panel 12 which comprises a polarization film 16, a glass substrate 17, liquid crystal 18, another glass substrate 19 and another polarization film 20.

These members are arranged laminatedly in order and mounted in a frame not shown. For the sake of convenience of description, The polarization films 16 and 20 are called "inner polarization film " and "outer polarization film ", respectively. And similarly, the glass substrate 17 and 19 are called "inner glass substrate" and "outer glass substrate", respectively.

On the glass substrates 17, 19, transparent electrodes are formed, respectively, while the liquid crystal 18 is interposed and shut in therebetween. The LCD panel 12 provides LCD cells having a matrix-like arrangement. Each LCD cell permits a light component having a particular polarization plane to be transmitted through the cell, the particular polarization plane being rotated depending on voltage applied to the transparent electrodes of the cell.

Each of the polarization films 16, 20 exclusively transmits a light component having a particular polarization plane (transmission polarization plane). These polarization films 16, 18 are orientated so that transmission polarization plane of the inner polarization film 16 has a predetermined relation with that of the outer polarization film 18. In a typical case, these transmission polarization plane make right angles to each other.

According to a feature of the present invention, the LCD panel 12 is arranged so that the light control face for correcting directivity of output illumination light from the surface light source device 11 looks toward the surface light source device 11.

In this embodiment, a prism sheet 21 is disposed inside of the inner polarization film 16 to provide a light control face. The prism sheet 21 is unified with the inner polarization film 16 by means of an adhesive for optical use which shows a high transmissivity for the illumination light. In other words, the polarization film 16 and the prism sheet 21 provide a composite optical element.

An inner face of the prism sheet 21 includes a prismatic surface to provide a light control face. This prismatic surface is provided with a great number of projection rows each of which has a triangular cross section. Each projection row is provided with a pair of slopes running approximately in parallel with the incidence end face 13A.

It should be noted that the surface light source device 11 and the LCD panel 12 are held so that an output face of the former and an input face of the latter do not contact with each other. In this embodiment, the output face of the former corresponds to the emission face 13C of the guide plate 13 and the input face of the latter corresponds to a (imaginary) plane on which tops of the projection rows of the prism sheet are disposed.

Thus designed arrangement prevents the tops of the projection rows of the prism sheet 21 and the emission face 13C from being rubbed each other. The plane on which the tops of the projection rows are spaced preferably in the rage from about 0.5 mm to about 1 mm off the emission face 13C, as shown in FIG. 1. An excessively large space will undesirably increases thickness of the LCD and decreases illumination efficiency. A practically tolerable upper limit is about 5 mm.

Such a spaced arrangement of the LCD panel and the surface light source device 11 is realized, for example, by employing such designs as using frames. According to a usual manner of design, the surface light source device 11 is mounted in a frame and the LCD panel 12 is mounted in another frame.

Edge portions of one or both of these frames have shapes to function as a spacer the above space distance. This space distance is adjustable depending on design of the edge portions. Instead of such manner employing edge portions of frame members, a spacer may be interposed between the frame members to keep them distant from each other.

Behaviour of illumination light L emitted from the fluorescent lamp 8 is outlined as follows. Illumination light L is, directly or after being reflected by the reflector 9, introduced into the guide plate 13 through the incidence end face. Thus introduced illumination light L propagates within the guide plate 13 with repeated reflections between the back face 13B and the emission face 13C.

Inner incidence angle to the emission face 13C becomes smaller according to repeated reflections by the back face 13B, thereby making escape from the emission face easy.

Emission from the emission face 13C is further made easy by a scattering pattern formed on the emission face 13C. The scattering pattern is preferably formed depending on distance from the incidence face 13A so that emission intensity (brightness) is uniformized. As previously mentioned, the prismatic surface formed on the back face of 13B modifies directivity so as to let it come near a frontal direction with respect to the emission face 13C regarding in a plane parallel to the incidence end face 13A.

In this embodiment, emission from the emission face 13C provides output illumination light of the surface light source device 11. As previously mentioned, this output illumination light propagates preferentially toward a direction inclined forward (emission directivity). Such oblique directivity is corrected by the prism sheet 21 which is incorporated in the LCD panel 12. As a result, propagation directions of input light for the polarization film 16 are around the frontal direction.

Component corresponding the transmission polarization plane of the polarization film 16 is transmitted through the film 16 to be supplied to the liquid crystal 18. Cells of the liquid crystal 18 rotates the polarization plane of the inputted light depending on voltage applied to the transparent electrodes. Thus the liquid crystal 18 provides output light to be impinged to the outer polarization film 20.

Component corresponding the transmission polarization plane of the polarization film 20 is transmitted through the film 16 and outputted toward the outside. A well known driving circuit applies voltage to the transparent electrodes depending on which distribution of the output intensity is controlled, thereby realizing variable imaging.

Since this embodiment employs the LCD panel 12 equipped with the polarization film 16, the prism sheet 21 is avoided from being contact with the emission face 13C of the guide plate 13. Accordingly, the emission face 13C is avoided from damaging the projections of the prism sheet 21. This leads naturally to avoidance of abnormal image which would appear when damaged projections are irradiated by illumination light L brightly.

In other words, the polarization film 16 and the prism sheets 21 are unified to provide a unified composite optical element which is harder to be deformed as compared with cases where they are not unified.

Besides, even if any member such as the guide plate 13 affected by deformation such as curving or expansion/contraction owing to factors such as variation of temperature, the prism sheet 13 is hard to contact with the emission face 13C of the guide plate 13, because the composite optical element is mounted in the LCD panel 12 which is held spaced from the surface light source device 11. Accordingly, the prism sheet 21 is prevented from sticking to the emission face.

Another point to be noted is that a sufficient space (for example, 0.5 mm to 1 mm) between the prism sheet 21 and the emission face 13C reduces gritty lookings which tends to appear when scattering pattern is formed on the emission face 13C.

Figure 2:
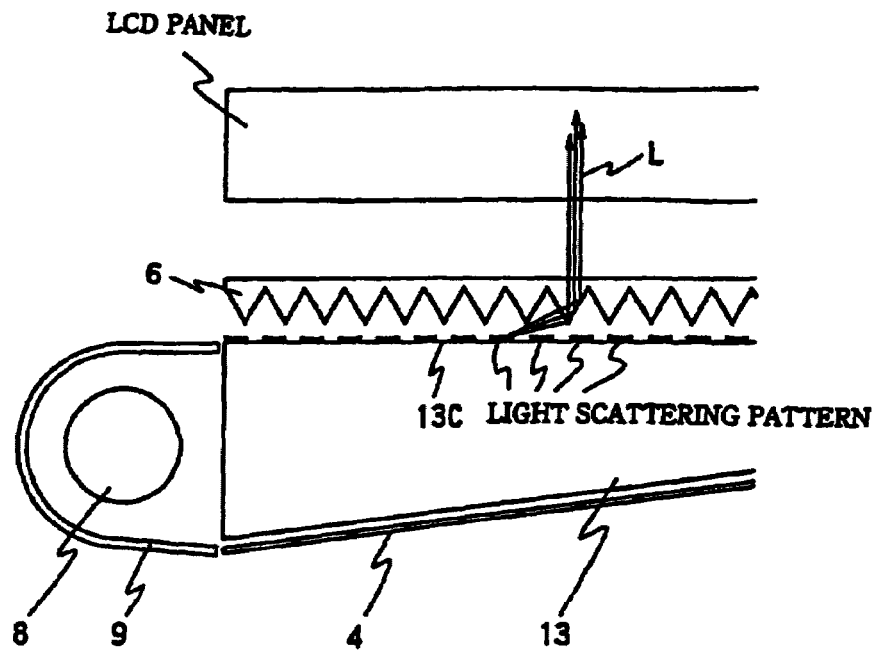
FIG. 2 is a cross section to illustrate glaring which appears on an emission face of a conventional guide plate.
Figure 3:
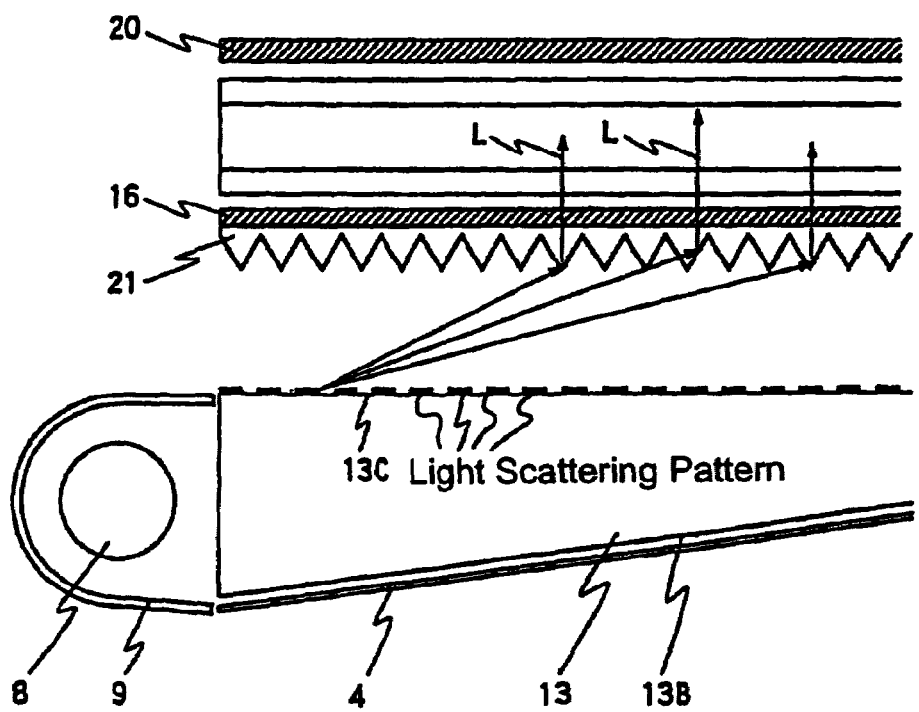
FIG. 3 is a cross section to illustrate reduced glaring which appears on an emission face according to an illustrating manner similar to that of FIG. 2.

This feature is explained by referring to FIG. 2 (Prior Art) and FIG. 3 (the present invention). FIG. 2 shows an arrangement in which the prism sheet 6 is disposed near to the guide plate 13. In this case, almost all of light which is scattered by one scattering element of scattering pattern is introduced into the prism sheet 6 through one slope surely. This light is inside-reflected by the other slope which forms a pair with the aforesaid slope and impinges to the LCD panel 12. This makes a great number of fine regions with high brightness, providing a factor leading to gritty lookings.

On the other hand, FIG. 3 shows another arrangement in which the prism sheet 21 is disposed spaced from the guide plate 13 (0.5 m or more). In this case, almost all of light which is scattered by one scattering element of scattering pattern is introduced into the prism sheet 21 through many slopes. This light is inside-reflected by the other slope which forms pairs with the aforesaid slopes respectively and impinges to the LCD panel 12.

That is, illumination light scattered by many scattering elements is diffused widely, respectively, and is then overlapped and mixed mutually. As a result, fine regions with high brightness are hard to be produced, leading to mild illumination an display without gritty lookings.

Still another point to be noted is that no air layer exists between the prism sheet 21 and the polarization film 16, because they are unified to provide a composite optical element.

In other words, number of air layers among elements is reduced as compared with prior arts. This leads to reduction of energy loss which is generated at interfaces between each element and air layer. Besides, foreign body such as trash is avoided from being interposed between the prism sheet 21 and the polarization film 16.

Figure 5:
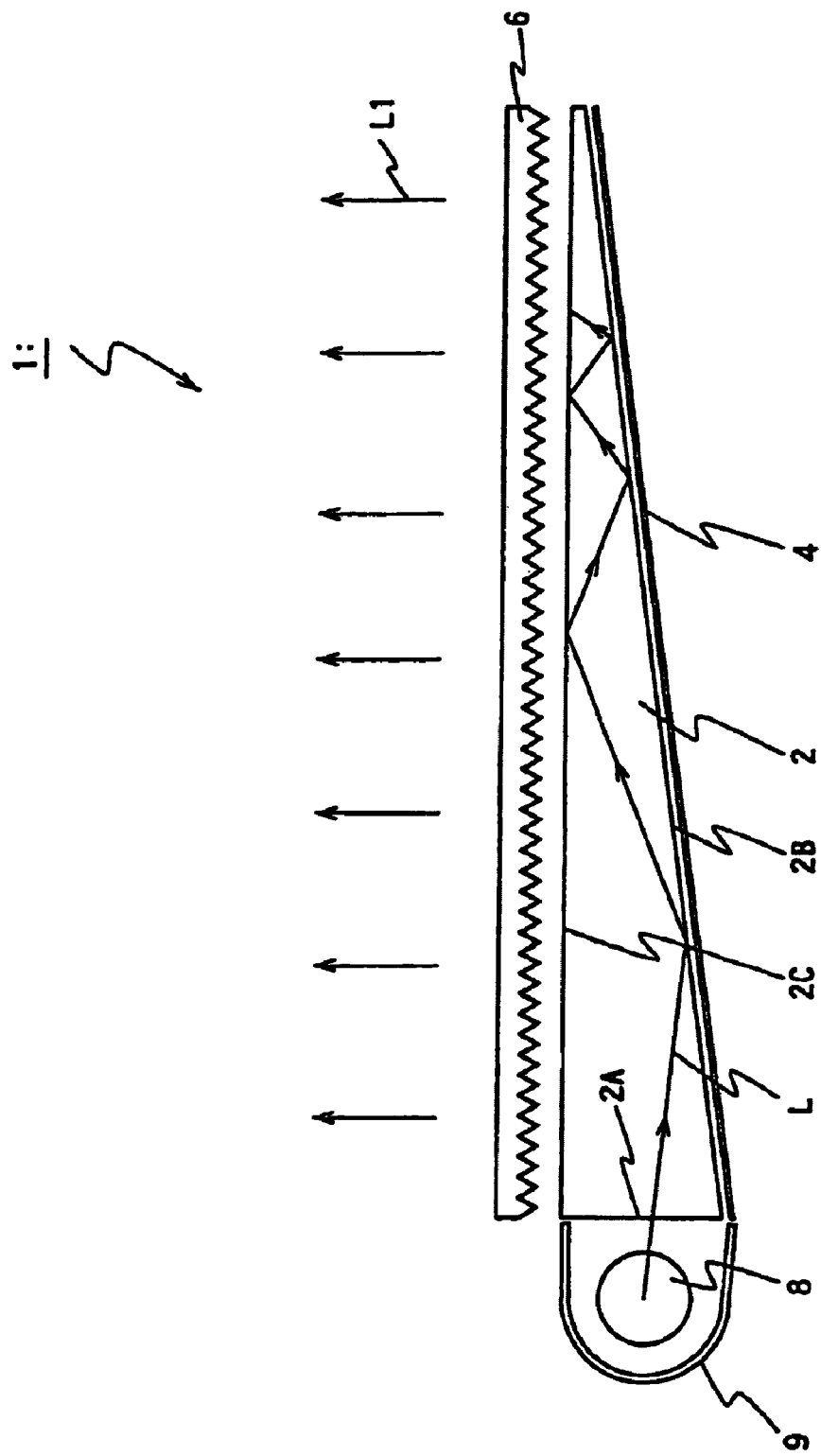
FIG. 5 is a cross section along line A—A shown in FIG. 4.

It is important particularly during assembling of LCDs to avoid interposition of foreign body. In LCD assembling according to prior arts, if trash or other foreign body is observed on an output face (outer face of the prism sheet 6) surface light source device 1 (see FIGS. 4, 5), they are removed by means of any suitable means before assembling for coupling with a LCD panel.

And, if such foreign body is interposed between a prism sheet and an emission face of a guide plate, particularly troublesome operations are required. That is, after a frame member of the LCD 1 is taken away, the prism sheet 6 must be taken away to remove the foreign body such as trash, being followed by re-assembling of the LCD.

In particular, if strong static electricity is generated, removing is difficult and sticking of trash or the like might be caused newly during the operations. The present embodiment enables such troubles to be avoided. Accordingly, operations for LCD assembling is simplified as compared with prior arts.

The above-described embodiment puts is not limitative to the present invention. For instance, the following modifications fall within the scope of the present invention.

(a) In the above embodiment, the inner glass substrate 17 and the inner polarization film 16 are separated. However, this puts no limitation onto the scope of the present invention.

For example, they may be unified. In this case, three elements consisting of the inner glass substrate 17, the inner polarization film 16 and the prism sheet, are unified. And mechanical strength of the glass substrate is improved.

(b) In the above embodiment, the prism sheet 21 is glued to the polarization film 16 to be unified with the film. However, this puts no limitation onto the scope of the present invention.

For example, instead of gluing of the two members, a great number of projection rows may be formed on a surface of the polarization film 16 to provide a light control face (prismatic surface). Forming techniques utilizing UV-curing agent may be applied to formation of such projection rows.

(c) In the above embodiment, the prism sheet 21 is glued to the polarization film 16 with a transparent optical glue. However, glues of different types may be employed. For example, a glue having light scattering property may be employed.

Such a glue forms a layer which functions like a light diffusion plate. In other words, scattering effect of the glue prevents fine periodically structured portions such as scattering pattern on the emission face 13C, projection rows on the prism sheet 21 or on the back face 13B from being conspicuous. Accordingly, such a glue is employable as a substitute for a diffusion plate, which can reduce number of components to be used.

(d) In the above embodiment, the prism sheet 21 is coupled with the polarization film 16. However, this puts no limitation onto the scope of the present invention.

For example, an employable arrangement comprises a light diffusion sheet member which is interposed between the prism sheet 21 and the polarization film 16.

This arrangement may comprises a composite optical element which is provided by coupling the light diffusion sheet member with the prism sheet 21. Three elements (prism sheet 21, light-diffusion sheet member and polarization film 16) may be coupled with one another to provide a composite optical element.

Another employable arrangement comprises a polarization separation sheet member which is interposed between the prism sheet 21 and the polarization film 16. As previously mentioned, the polarization separating sheet member has property that allows input light component having a polarization plane to be transmitted while reflecting input light component having another polarization plane perpendicular to the polarization plane.

Figure 6:
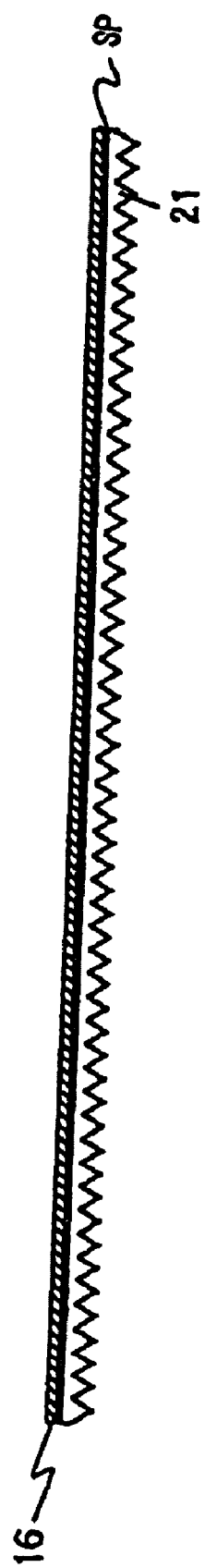
FIG. 6 is a modified composite element having a prism sheet, a polarization separating sheet and a polarization film.

In this case, the polarization separation sheet member may be coupled with the prism sheet 21 to provide a composite optical element. Three elements (prism sheet 21, polarization separation sheet member SP and polarization film 16) may be coupled with one another to provide a composite optical element, as shown in FIG. 6.

It should be noted that the polarization film 16 may be omitted so far as polarization separation effect of the polarization separation sheet member is enough and satisfactory.

(e) In the above embodiment, the back face 13B of the guide plate 13 is provided with a great number of projection rows to provide a light control face. However, this puts no limitation onto the scope of the present invention. The back face 13B may not be provided with a great number of projection rows.

A great number of projection rows may be formed on the emission face 13C. In this case, the spacing arrangement according to a feature of the present invention will prevent top portions of the prism sheet from being contacted with top portions of the projection rows on the emission face, with the result that the top portions of both are not affected by damage or deformation.

Provided that the present invention is not applied, the top portions of both will come to point-contacted state which surely brings striking damage or deformation.

(f) In the above embodiment, the guide plate 13 is a transparent member. However, this puts no limitation onto the scope of the present invention; guide plates made of materials of other types may be employed. For example, a scattering guide plate provide with scattering power inside of itself.

(g) In the above embodiment, light supply to the guide plate 13 is carried out through one incidence end face. However, this puts no limitation onto the scope of the present invention; two or more incidence end faces may be used for light supply.

(h) In the above embodiment, the guide plate 13 having wedge-like cross section is employed. However, this puts no limitation onto the scope of the present invention; guide plates having differently shaped cross sections may be employed.

For example, a guide plate having a long and narrow rectangular cross section, namely, having uniform thickness.

(i) In the above embodiment, a rod-like fluorescent lamp is employed to provide a primary light source. This puts no limitation onto the scope of the present invention; light source element of other types may be employed to provide a primary light source. For example, arrayed point-like light sources such as LEDs (Light Emitting Diodes) may be employed.

What is claimed is:

1. A liquid crystal display device, comprising:
   a surface light source device;
   a unified composite optical element comprising:
     a polarization film; and
     a prismatic light control element having projection rows facing the surface light source device, the prismatic light control element being formed directly on one face of the polarization film such that together, the polarization film and the prismatic light control element form the unified composite optical element; and
   a liquid crystal display panel formed adjacent to the unified composite optical element with the polarization film facing the liquid crystal display panel,
   wherein the surface light source device and the projection rows of the prismatic light control element are separated by a distance of 0.5 to 1 mm.

2. A liquid crystal display device, comprising:
   a surface light source device;
   a unified composite optical element comprising:
     a polarization film;
     a polarization separating sheet which transmits light components having a first polarization plane and reflects light components having a second polarization plane perpendicular to the first polarization plane; and
     a prismatic light control element having projection rows facing the surface light source device, the polarization separating sheet being interposed between the polarization film and the prismatic light control element,
   such that together, the polarization film, the polarization separating sheet and the prismatic light control element form the unified composite optical element with the prismatic light control element serving as one face of the composite optical element, and
   a liquid crystal display panel formed adjacent to the unified composite optical element with the polarization film of the unified composite optical element facing the liquid crystal display panel
   wherein the surface light source device and the projection rows of the prismatic element are separated by a distance of 0.5 to 1 mm.

\* \* \* \* \*